United States Patent
Hasegawa et al.

[19]

[11] Patent Number: 5,961,641
[45] Date of Patent: Oct. 5, 1999

[54] DATA PROCESSOR AND DATA PROCESSING SYSTEM

[75] Inventors: Hironobu Hasegawa, Kodaira; Hiroyuki Sasaki, Fucyu; Masahiko Uraguchi, Higashimurayama, all of Japan

[73] Assignee: Hitachi, Ltd., Tokyo, Japan

[21] Appl. No.: 08/864,970

[22] Filed: May 29, 1997

[30] Foreign Application Priority Data

May 31, 1996 [JP] Japan .................................... 8-138111

[51] Int. Cl.⁶ .............................................. G06F 15/177
[52] U.S. Cl. .............................................. 713/1; 709/208
[58] Field of Search .......................... 395/700, 704; 364/200; 713/1; 709/208; 710/15; 714/34

[56] References Cited

U.S. PATENT DOCUMENTS

| | | | |
|---|---|---|---|
| 4,451,882 | 5/1984 | Dshkhunian et al. ................. | 364/200 |
| 5,444,861 | 8/1995 | Adamec et al. ........................ | 395/700 |
| 5,675,800 | 10/1997 | Fisher, Jr. et al. .................... | 395/700 |
| 5,680,620 | 10/1997 | Ross ....................................... | 395/704 |

OTHER PUBLICATIONS

DSP 96002 User's Manual, Section 10, On–Chip Emulator, pp. 10–1–10–22.

*Primary Examiner*—Hassan Kizou
*Assistant Examiner*—Omar A. Omar
*Attorney, Agent, or Firm*—Fay, Sharpe, Beall, Fagan, Minnich & McKee

[57] ABSTRACT

A data processor has a ROM that holds a boot program for causing the CPU to transfer a debug program from a serial interface circuit to a debug-use RAM area. When supplied externally with an SDI boot command, the serial interface circuit outputs an SDI interrupt request signal (SDI_boot) to an interrupt controller. The signal causes the CPU to execute the boot program. Debug operations are varied as per the contents of the downloaded debug program, and data exchanges upon debugging are carried out serially.

21 Claims, 15 Drawing Sheets

FIG. 3

SDIR

| TS2 | TS1 | TS0 | —* | ..... | —* |

\* : RESERVED BIT

| TS2 | TS1 | TS0 | COMMAND |
|---|---|---|---|
| 1 | 0 | 0 | BOOT COMMAND |
| 1 | 0 | 1 | SDI INTERRUPT COMMAND |
| 1 | 1 | 0 | SDI BREAK COMMAND |

FIG. 4

| ASEMD0 | COMMENT |
|---|---|
| 0 | ASE MODE (EVALUATION CHIP MODE) |
| 1 | MAIN UNIT CHIP MODE (PRODUCT CHIP MODE) |

EVALUATION MODE (USER MODE)

EVALUATION MODE (BREAK MODE)

INTERNAL EMULATOR SPACE IN BREAK MODE (A) EXECUTION OF THE BOOT PROGRAM
 1. DATA AND PROGRAMS ARE DOWNLOADED TO THE ASERAM BY EXECUTION OF THE BOOT PROGRAM (IN BREAK MODE)
 2. AFTER DOWNLOADING, PROCESSING BRANCHES TO THE ASERAM
(B) THE DEBUGGING PROGRAM IS EXECUTED IN THE ASERAM (A) NORMAL OPERATION STATE
(B) PROGRAM EXECUTION IN THE ASERAM
1. A HARDWARE BREAK VECTOR IS READ
2. PROCESSING BRANCHES TO THE ASERAM
3. THE DEBUGGING PROGRAM IS EXECUTED IN THE ASERAM

DATA PROCESSOR AND DATA PROCESSING SYSTEM

BACKGROUND OF THE INVENTION

The present invention relates to data processors including microcomputers, digital signal processors, microcontrollers and microprocessors especially with debug support features such as emulation. More particularly, the invention relates to a data processor for debugging a microcomputer-based system in a real-use operation environment such as outdoors.

The microcomputer-based system (also called the target system) may be debugged by means of a microcomputer for evaluation use with debug support features. In interfacing the evaluation-use microcomputer to a debugging host system, a large number of signal lines may be used to transmit in parallel data, addresses and control signals equivalent to those of the interface between the microcomputer in question and the target system. However, where the target system is appreciably small in volume as in the case of a portable communication terminal, it is often impossible practically to equip the circuit board of the system with pins or connectors for connecting numerous signal lines.

One proposed solution to such a bottleneck is the use of a serial interface with the debugging host system. Technical aspects of the solution are discussed illustratively in "DSP 96002 User's Manual" (SECTION 10, ON-CHIP EMULATOR; p10–1~p10–22).

The technique described in the publication above involves incorporating in a digital signal processor a command decoder and a break point control circuit for debugging purposes as well as a serial interface for debug use which allows data to be input and output serially in synchronism with a clock signal. Debug commands are fed externally to the processor through the serial interface. The command decoder decodes the commands thus supplied. The decoded result is referenced in controlling write and read operations to and from internal registers as well as in controlling break points.

SUMMARY OF THE INVENTION

With the conventional technique outlined above, the debug command functions are predetermined fixedly and are thus limitative of the degree of flexibility with which to set simulated internal states for a data processor or to reference internal states of the data processor for debugging purposes. Given the fact that data processors such as digital signal processors are adapted extensively to various data processing systems, the debug support features thus restricted are not quite convenient to use. In other words, debug operations lack variability.

Adopting the above-mentioned serial interface reduces the number of connectors for connection with the debugging host system. However, to minimize the number of signals requires reevaluating the control techniques of handshaking for asynchronous serial data input and output between the data processor in question and its external environment.

It is therefore an object of the present invention to provide a data processor capable of minimizing the number of signal terminals for debugging.

It is another object of the invention to provide a data processor allowing debug operations to be varied easily.

It is a further object of the invention to provide a data processor that permits debugging in an environment close to the real-use condition in which a target machine (i.e., product system) will be operating, and to provide a data processing system that utilizes such a data processor.

These and other objects, features and advantages of the invention will become more apparent upon a reading of the following description and appended drawings.

In carrying out the invention and according to one aspect thereof, there is provided as outlined in FIG. 1 a data processor 1 formed on a semiconductor chip and comprising a central processing unit 10, storage means 11 accessible by the central processing unit 10, an interrupt controller 12 for controlling interrupts to the central processing unit 10, serial interface means 15 for outputting and inputting data serially to and from the outside of the data processor 1, and an internal bus 16 for connecting these component means and units The storage means 11 includes a rewritable first storage area 111 and a second storage area 112 holding a boot program for causing the central processing unit 10 to transfer data from the serial interface means 15 to the first storage area 111. The serial interface means 15 receives and decodes a first command (SDI boot command) from the outside, and outputs a first interrupt request signal (SDI_boot) to the interrupt controller 12 in accordance with the decoded first command. The interrupt controller 12 supplies the central processing unit 10 with first interrupt control data for executing the boot program in response to the first interrupt request signal.

When a system to which the data processor is applied (i.e., target system) is subjected to software or system debugging, a user program to be debugged is executed by the data processor. The data acquired from execution of the program is referenced externally when the user program is traced for debugging through its execution. Where any data arising from user program execution needs to be referenced from the outside or where desired operating conditions are to be set for the user program, it is necessary for the data processor to execute a debug control program different from the user program. The boot program mentioned above is a program that causes the central processing unit to download such a debug control program to an area different from a user program storage area. An appropriate debug control program may be prepared beforehand as needed depending on the constitution of the system to be debugged. In operation, the host system issues the first command mentioned above to the serial interface means. This causes the data processor to start the boot program, downloading the debug control program from the serial interface means to the first storage area. That is, when data coming out of the process of user program execution is to be referenced externally or when desired operating conditions are to be set for the user program, all operations involved are performed under control of the downloaded debug control program. Because all debug operations are carried out as per the suitably prepared debug control program, the variability of debug operations is guaranteed. Debug operations by the data processor are in no way limited because of the types of commands that may be accepted by the serial interface means.

The serial interface means for interfacing with the host system reduces the number of interface terminals for debugging purposes. Under such constraints, both the variability of debug operations and the ease of use are still ensured by the inventive data processor.

Where the target system is a portable communication terminal or a similar device to be carried around, it may be desired to subject the target system to system or software debugging in an outdoor setup approximating the actual use environment. Such debugging conditions are readily met by the data processor with its reduced number of interfacing terminals for debug use together with its enhanced debug operation versatility and ease of use.

In one preferred structure according to the invention, the second storage area may include a region 112A accommodating a first vector used by the central processing unit to acquire a starting instruction address of the boot program upon receipt of the first interrupt control data.

In another preferred structure according to the invention, the boot program may include, at the end thereof, an instruction for causing instruction execution of the central processing unit to branch to a predetermined address of the debug control program transferred to the first storage area. This feature makes it possible automatically to activate the downloaded debug control program, thereby starting initial control operations immediately.

Illustratively, where one such initial control operation is the downloading of a user program to be debugged, the storage means may have a rewritable third storage area 110, and the debug control program may include a transfer control program for transferring data from the serial interface means to the third storage area.

In the above setup, the user program is placed in a memory area inside the data processor. This allows the user program to be run at the actual operating speed for debugging purposes. While the user program is being executed, it may be desired for the host system to switch processing of the central processing unit to the debug control program as needed (i.e., break operation) through the serial interface means. In that case, the serial interface means may output a second interrupt request signal (SDI_brk) to the interrupt controller in accordance with a second command (SDI break command) supplied externally; in response to the second interrupt request signal, the interrupt controller may supply the central processing unit with second interrupt control data for causing the central processing unit to execute a predetermined instruction of the debug control program in the first storage area.

In the above setup, the first storage area may include a region 111B accommodating a second vector used by the central processing unit to acquire a predetermined instruction address of the debug control program upon receipt of the second interrupt control data. Because the region 111B may have its contents updated by the central processing unit in accordance with the debug control program, it is possible to determine, as desired, debug processing to be executed by issuance of such break commands.

Halfway through user program execution, it may be desired for the host system to make an interrupt as needed through the serial interface means. In such a case, the serial interface means may output a third interrupt request signal (SDI_int) to the interrupt controller in accordance with a third command (SDI interrupt command) supplied externally; in response to the third interrupt request signal, the interrupt controller may supply the central processing unit with third interrupt control data for causing the central processing unit to execute a predetermined program in either the third storage area or a user memory space.

According to anther aspect of the invention, there is provided a data processor 1 for communicating data for debug operations with a host system via serial interface means. As outlined in FIG. 1, the data processor 1 is formed on a semiconductor chip and comprises a central processing unit 10, storage means 11 accessible by the central processing unit 10, an interrupt controller 12 for controlling interrupts to the central processing unit 10, and the serial interface means 15. The serial interface means 15 includes a flag (FLG) operable both externally and by the central processing unit 10, a data register (SDDR) accessible both externally and by the central processing unit, and a command decoder 154 for receiving and decoding an externally supplied command and for supplying the interrupt controller 12 with an interrupt request signal reflecting the decoded result, the serial interface means 15 further permitting asynchronous serial data input and output between the data processor 1 and the outside thereof. The storage means 11 includes a rewritable first storage area 111 and a second storage area 112 holding a boot program for causing the central processing unit 10 to transfer data from the data register of the serial interface means 15 to the first storage area 111. In response to a first interrupt request signal (SDI_boot) included in the interrupt request, the interrupt controller 12 supplies the central processing unit 10 with first interrupt control data for causing the central processing unit 10 to execute the boot program. In executing the boot program, the central processing unit 10 gains access to the data register (SDDR) if the flag (FLG) is in a first state, the central processing unit 10 further changing the flag (FLG) to a second state when access to the data register (SDDR) is completed.

When data is input and output serially and in an asynchronous fashion between the data processor and the outside thereof via the serial interface means, access to the data register by the central processing unit is permitted depending on the state of the flag (FLG). This prevents inadvertent overwrite operations on the data register that is accessed asynchronously both by the central processing unit and from the outside thereof, whereby asynchronous data exchanges with the outside are carried out with ease.

When the flag is placed in the second state, the data register may be accessed from outside of the data processor. Upon completion of access to the data register, the flag may be reverted to the first state.

Illustratively, where it is desired to use serial data input/output signal lines to output flag data to the outside of the data processor without resorting to dedicated signal lines, there may be additionally provided a state controller 153 for making the data register accessible from outside the data processor upon detection of the flag in the second state being output to the outside of the data processor, the state controller further allowing the flag to be changed to the first state upon completion of access to the data register by the data processor.

A data processing system comprising the inventive data processor may have a circuit board 50 incorporating an external connection connector 51 attached to the serial interface means included in the data processor. This connector 51 is used to connect the serial interface means to a debugging tool for debug control or to the host system.

BRIEF DESCRIPTION OF THE DRAWINGS

FIG. 3 is an explanatory view of a typical command register included in a serial interface circuit;

FIG. 4 is an explanatory view indicating typical microcomputer operation modes set by an emulator mode signal ASEMOD;

DESCRIPTION OF THE PREFERRED EMBODIMENTS

Outline of the Microcomputer

Figure 1:
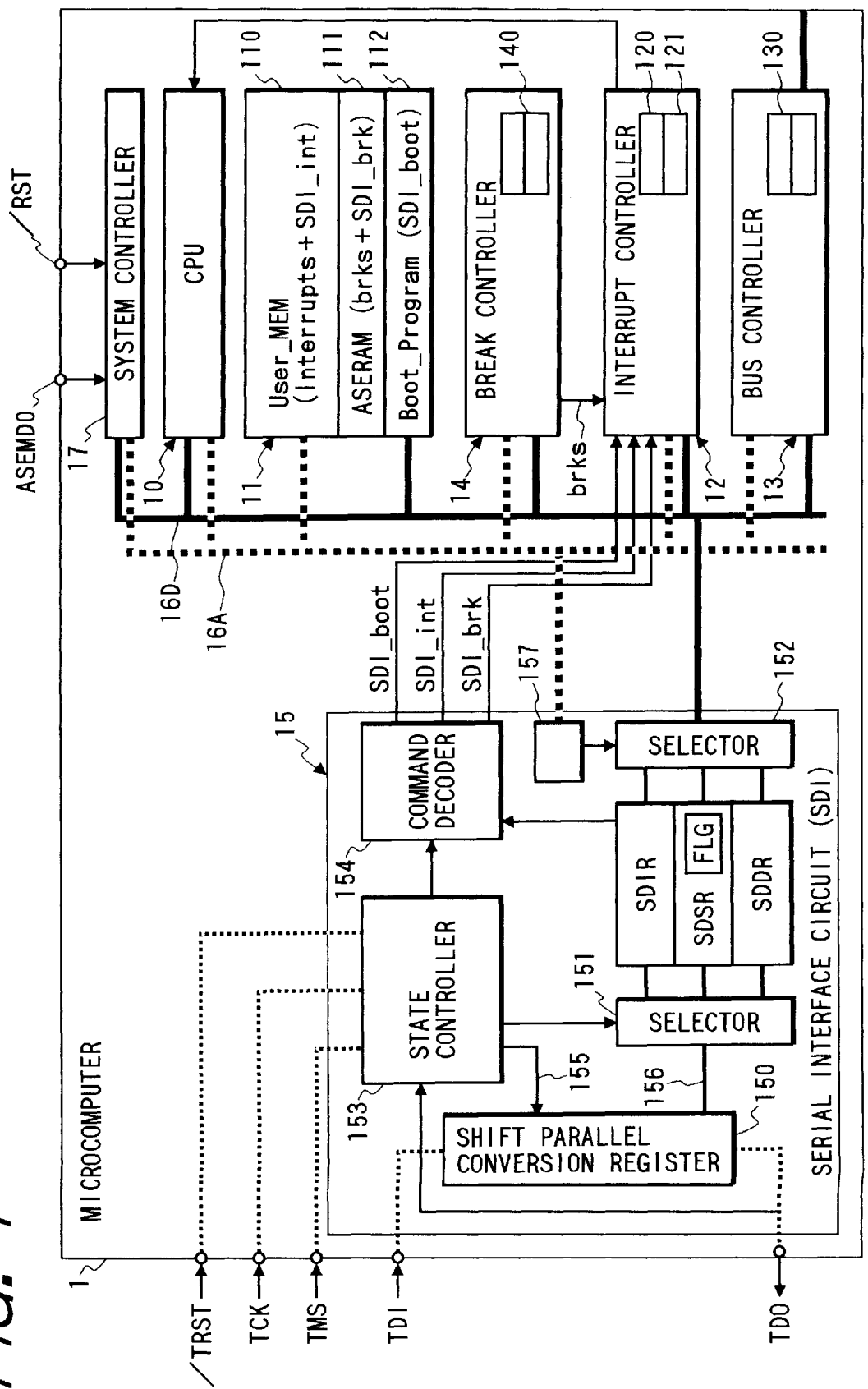
FIG. 1 is a block diagram of a microcomputer practiced as an embodiment of the invention.

FIG. 1 is a block diagram of a microcomputer 1 practiced as one preferred embodiment of the invention. The microcomputer 1 is formed on, but not limited by, a semiconductor substrate made illustratively of silicon single crystal through the use of known semiconductor integrated circuit fabrication techniques.

The microcomputer 1 comprises a central processing unit (also called the CPU) 10, an internal memory 11 accessible by the CPU 10, an interrupt controller 12 for controlling interrupts to the CPU 10, a bus controller 13, a break controller 14, a system controller 17, and a serial interface circuit (SDI) 15 for permitting serial data input and output between the microcomputer 1 and the outside thereof. These components are interconnected typically by an internal bus 16D and an internal address bus 16A. Where product-sum operational circuits are included in the circuit block of the CPU 10, it is possible to constitute the microcomputer 1 as a data processor such as a digital signal processor dedicated to digital signal processing.

The microcomputer 1 shown in FIG. 1 is equipped with debug support features but not limited thereby. The break controller 14 and serial interface circuit 15 are furnished especially to support debugging. A microcomputer devoid of such debug support features is sometimes called a product chip for distinction from its counterpart provided with the features. A microcomputer functionally equivalent to its product-chip counterpart and furnished with the debug support features is sometimes called an evaluation chip.

The internal memory 11 in the microcomputer 1 as an evaluation chip offers a storage area for accommodating an operation program for the CPU 10 in the form of a RAM (random access memory) instead of a ROM (read only memory) as is the case with most product chips. The RAM area is shown in FIG. 1 as a user memory area (User_MEM) 110. In the internal memory 11, the area 111 constitutes a debug-use RAM area (ASERAM) that holds a debug control program (debug program) and other control data. Reference numeral 112 represents a boot program area (Boot_Program) that retains illustratively a boot program for causing the CPU 10 to transfer the debug program and other data from the serial interface circuit 15 to the debug-use RAM area 111. The boot program area 112 is a ROM area.

The bus controller 13 controls the width of data access and a process of wait cycle insertion with respect to an access target area upon access to a bus by the CPU 10 inside and outside the microcomputer. The manner of control contingent on a given address range by the bus controller 13 is determined by the value set in a register 130 by the CPU 10.

The break controller 14 has a register 140 in which the CPU 10 sets a break condition in break mode (to be described later). In user mode (also described later), the break controller 14 checks to see if there appears on the internal data bus 16D or internal address bus 16A a state that matches a break condition made of a program address or a data value set in the register 140. If a state matching the break condition is detected, the break controller 14 supplies a break interrupt request signal brks to the interrupt controller 12.

The interrupt controller 12 controls interrupts to the CPU 10. The interrupt controller 12 is fed with a break interrupt request signal brks and with interrupt request signals SDI_boot, SDI_int and SDI_brk from the serial interface circuit 15. Furthermore, the interrupt controller 12 is supplied with an external interrupt request signal and an internal interrupt request signal, neither shown. Two logic circuits 120 and 121 are included in the interrupt controller 12. The logic circuit 120 matches interrupt requests with interrupt cause data, and the logic circuit 121 determines the priority of each interrupt request. When interrupt requests occur, interrupt priorities corresponding to the requests are referenced so that the requests are accepted and serviced in order of their priorities. The CPU 10 is suppiled with interrupt cause data and an interrupt signal corresponding to each accepted interrupt request. The CPU 10 calculates and acquires a vector address from the interrupt cause data, and branches its processing to an instruction address designated by the interrupt vector thus obtained. Needless to say, the CPU 10 saves in time the data necessary for a return from the interrupt handling.

Serial Interface Circuit

Figure 2:
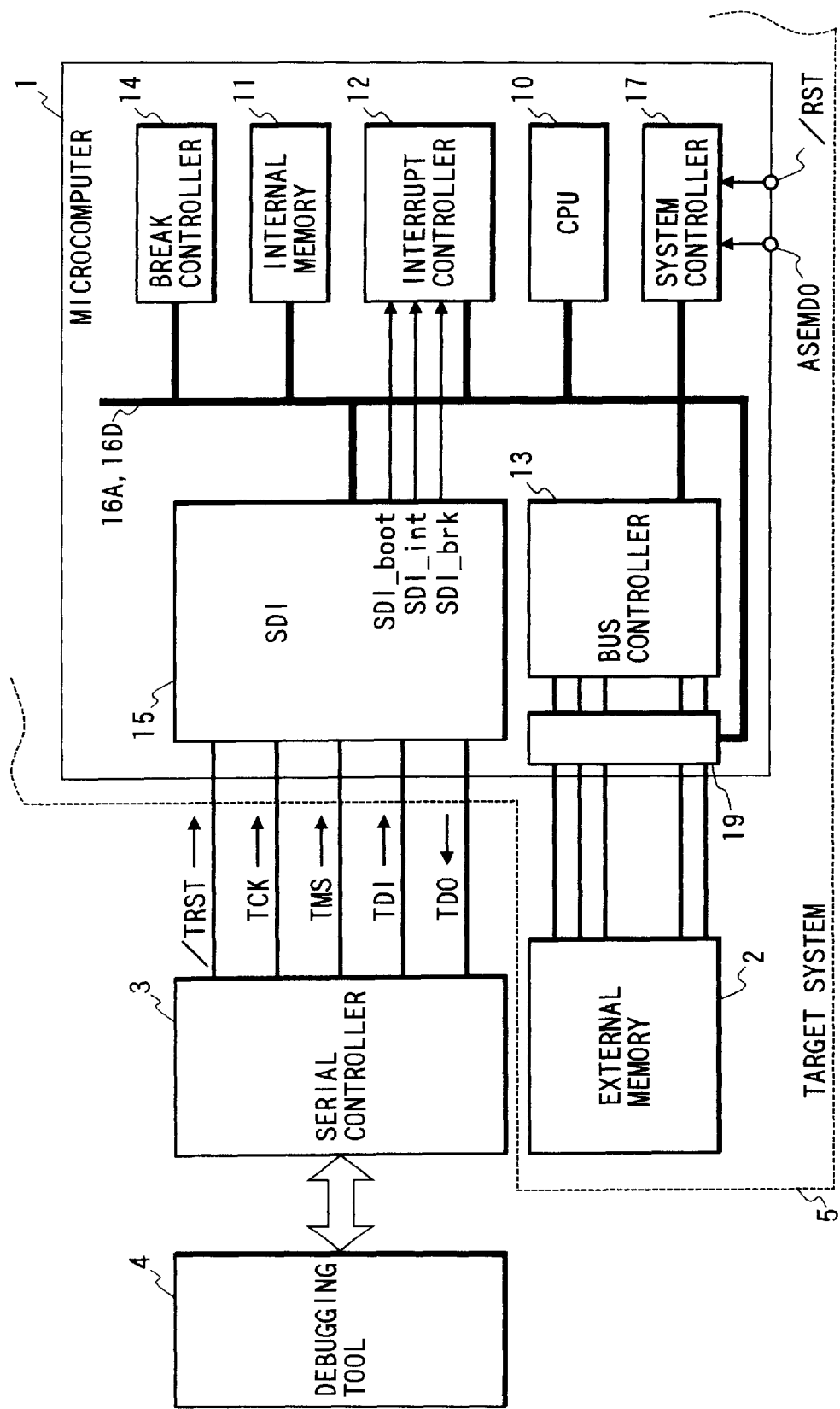
FIG. 2 is a block diagram of a typical setup in which a target system incorporating the microcomputer of FIG. 1 is interfaced with a debugging tool.

The serial interface circuit 15 is a circuit that permits asynchronous serial data input and output between the microcomputer 1 and the outside thereof. As illustrated in FIG. 2, where a system (i.e., target system) using the microcomputer 1 is to be debugged, the serial inter face circuit 15 acts as a debugging circuit that interfaces the microcomputer 1 to the host system (i.e., debugging tool) 4 via a serial controller 3. In FIG. 2, reference numeral 2 represents an external memory attach ed to the target system 5. The external memory 2 is connected to the bus controller 13 through an input/output port 19, not shown int FIG. 1.

As indicated in FIG. 1, the serial interface circuit 15 comprises a shift parallel conversion register 150, selectors 150 and 151, a command register SDIR, a status register SDSR, a data register SDDR, a state controller 153 for controlling data input and output regarding the serial controller 3, a register controller 157 for controlling data input and output regarding the CPU 10, and a command decoder 154. The shift parallel conversion register 150 and data register SDDR are each constituted by, but not limited to, a 32-bit register each. The command register SDIR and status register SDSR are each made of a 16-bit register but not limited thereto.

The shift parallel conversion register 150 is a shift register that has serial-in/parallel-out and parallel-in/serial-out functions. In operation, the shift parallel conversion register 150 shifts serial data fed from a serial data input terminal TDI in synchronism with a shift clock signal 155, and outputs the result as parallel data onto a bus 156; parallel data fed from the bus 156 is shifted in synchronism with the shift clock signal 155 and output as serial data from a serial data output terminal TDO.

The selector 151 selects one of the data I/O terminals on each of the command register SDIR, status register SDSR and data register SDDR and connects the selected terminals to the bus 156. The selector 152 selects the other of the data I/O terminals on each of the registers SDIR, SDSR and SDDR and connects the selected terminals to the data bus 16D.

The register controller 157 receives address data and read/write signals from the bus controller 13. In operation, the register controller 157 decodes the address signal and controls the selector 152 by generating signals with which to select the terminals of the registers SDIR, SDDR and SDSR as well as read/write signals for read/write operations on the registers. This allows the CPU 10 to access the registers SDIR, SDSR and SDDR as needed.

As shown in FIG. 3, the command register SDIR is supplied with a boot command, an SDI interrupt command or an SDI break command in three bits TS0, TS1 and TS2. When fed with a boot command, the command decoder 154 gives an interrupt request signal (SDI boot interrupt request signal) SDI_boot to the interrupt controller 12. Likewise, when supplied with an SDI interrupt command or an SDI break command, the command decoder 154 gives an interrupt request signal SDI_int (SDI interrupt request signal) or an interrupt request signal SDI_brk (SDI break interrupt request signal) respectively to the interrupt controller 12. What takes place in response to these interrupt requests will be described later in detail.

Access to the serial interface circuit 15 by the serial controller 3 in synchronism with a transfer clock signal TCK occurs asynchronously with regard to access to the serial interface circuit. 15 by the CPU 10. To facilitate control in such a case over data transfers between the serial controller 3 and the CPU 10, the status register SDSR has a one-bit flag FLG. The flag FLG is referenced so as to let either the CPU 10 or the serial controller 3 gain exclusive access to the data register SDDR. When set to a logical 0, the flag FLG allows the CPU 10 to access the data register SDDR and prevents the serial controller 3 from gaining access thereto. When set to a logical 1, the flag FLG enables the serial controller 3 to access the data register SDDR and keeps the CPU 10 from gaining access to the latter. The status register SDSR also has other bits representing internal status of the serial interface circuit 15.

Figure 5:
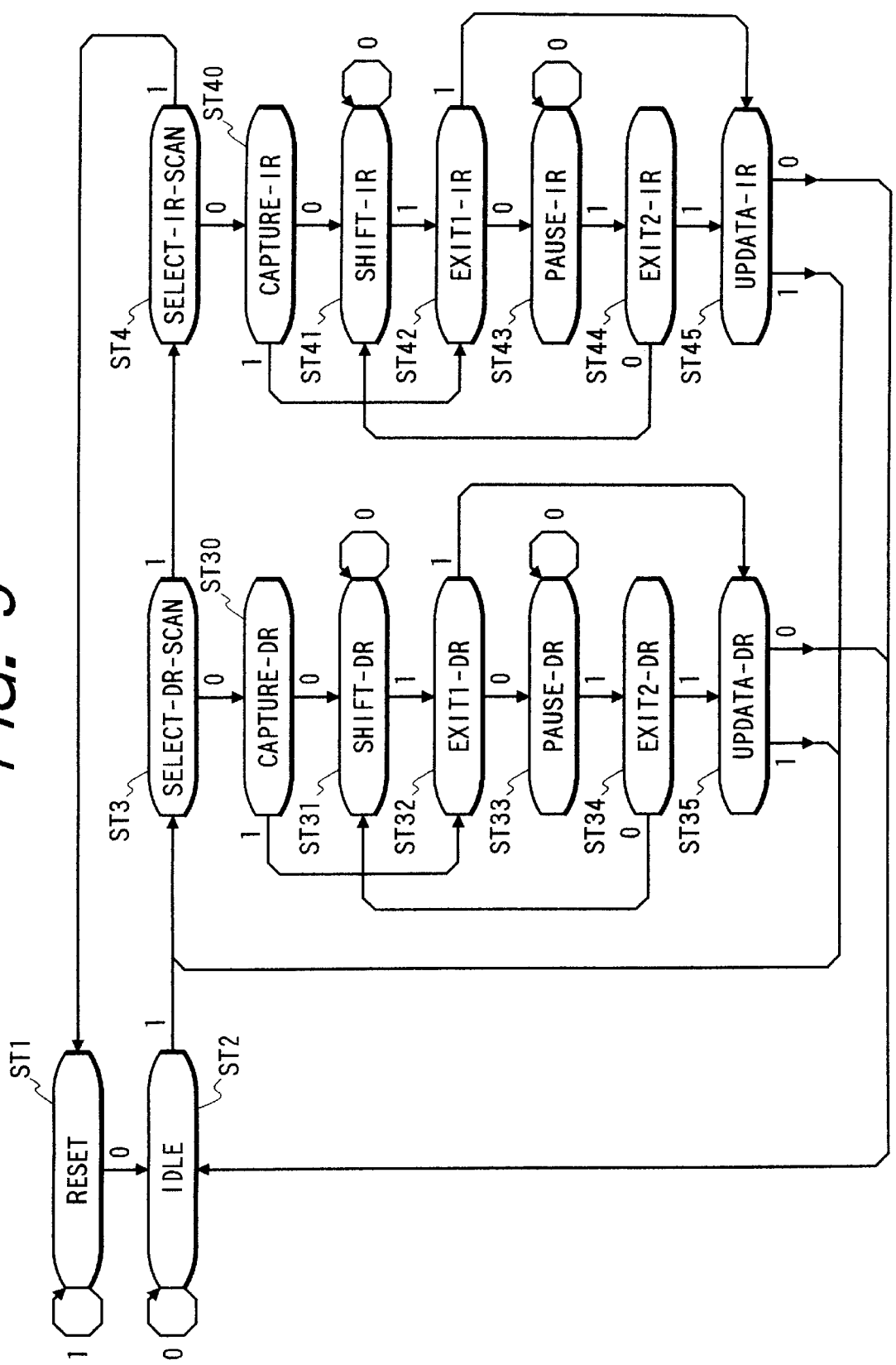
FIG. 5 is a state transition diagram depicting state transition control effected by a state controller included in the serial interface circuit.

The serial controller 3 controls data transfers to the serial interface circuit 15 by observing the flag FLG that is output in a state ST31 by the state controller 153 in FIG. 5. When detecting via the serial data output terminal the flag FLG being set to 1, the serial controller 3 downloads data (such as the debug program) to the serial data input terminal TDI, and uploads data (e.g., data indicating internal status of the microcomputer in debug mode) from the serial data output terminal TDO. The serial controller 3 will not carry out data transfers, i.e., will not access the data register SDDR unless and until the flag FLG is set to 1. When the flag FLG is set to 1, the CPU 10 is denied access to the data register SDDR. Illustratively, the bus controller 13 puts into the wait state the attempt by the CPU 10 to access the data register SDDR. With data transfers completed, the serial controller 3 clears the flag FLG to 0. Clearing the flag FLG allows the CPU 10 to resume its access, so far placed in the wait state, to the data register SDDR for a write or a read operation thereto or therefrom. After completing its access to the data register SDDR, the CPU 10 sets the flag FLG to 1. When detecting the flag FLG being set to 1, the serial controller 3 again enables the serial interface circuit 15 to access the data register SDDR.

In short, the serial controller 3 accesses the data register SDDR when the flag FLG is set to 1, and clears the flag to 0 when the access operation is completed. The CPU 10 gains access to the data register SDDR when the flag FLG is cleared to 0, and sets the flag to 1 when the access operation is completed. The flag-based regulatory or control scheme outlined above prevents inadvertent overwrite operations on the data register SDDR that is accessed asynchronously by the CPU 10 and serial controller 3, whereby asynchronous serial data transfers with the outside are easily carried out.

The state controller 153 receives a reset signal/TRST, a transfer clock signal TCK and a state control signal TMS, each a single-bit signal. The reset signal/TRST is used as a reset signal to initialize the serial interface circuit 15. The transfer clock signal TCK is used as a synchronizing clock signal to transfer data via the serial data input and output terminals TDI and TDO. The signal TCK also serves as a reference clock signal according to which the state controller 153 operates. Referencing the serial data output terminal TDO, the state controller 153 checks to see if, when the flag FLG is found to be output from the serial data output terminal TDO via the shift parallel conversion register 150, the output flag FLG has the logic value of 1.

The state controller 153 is a so-called state machine. It causes transition of the internal control status in the serial interface circuit 15 in a predetermined order. The direction of the transition is determined by the logic value of the state control signal TMS.

FIG. 5 is a state transition diagram depicting state transition control effected by the state controller 153. In FIG. 5, ST1 stands for a reset state, ST2 for an idle state, ST3 for a selected state of the data register SDDR (or status register SDSR), and ST4 for a selected state of the command register SDIR. The direction in which the current state is followed by the next is determined by logic values 1 and 0 of the state control signal TMS.

Either the register SDDR or the register SDSR is selected depending on whether or not the flag FLG having the logic value of 1 is output to the outside through the serial data output terminal TDO. That is, the state controller 153 selects the data register SDDR in state ST3 upon sensing that the flag FLG being 1 is output to the outside through the serial data output terminal TDO.

If TMS=0 in state ST3, then the state controller 153 allows states ST30 through ST35 to be selected successively as per the logic value of the state control signal TMS. ST30 is a capture state in which the data of the register SDDR (SDSR) is output to the shift parallel conversion register 150; ST31 is a shift state in which the shift parallel conversion register 150 is shifted in synchronism with the transfer clock signal TCK when the control signal TMS is set to 0; ST32 is a work state (a reserved state for operation switchover); ST33 is a pause state; ST34 is another work state (a reserved state for operation switchover); and ST35 is an update state in which data is output parallelly from the shift parallel conversion register 150 to the register SDDF. (SDSR). The process brings the supplied data from the serial data input terminal TDI into the register SDDR via the shift parallel conversion register 150. Furthermore, the process outputs the set data from the register SDDR (SDSR) through the serial data output terminal TDO via the shift parallel conversion register 150.

Illustratively, resetting the serial interface circuit 15 initializes the flag FLG to the logical 1. Here, the register selected in state ST3 is the status register SDSR. When the flag FLG is read out in capture state ST30, the state controller 153 detects the output flag. Upon return to state ST3, the data register SDDR is selected. This allows the data fed from the serial data input terminal TDI to be placed into the data register SDDR in shift state ST31 and update state ST35. Illustratively, once update state ST35 is left, the register selection status in the subsequent state ST3 is initialized to the status register SDSR.

If TMS=0 in state ST4 in which to select the command register SDIR, the state controller 153 allows states ST40 through ST45 to be selected successively as per the logic value of the state control signal TMS. ST40 is a capture state in which the command in the command register SDIR is output to the shift parallel conversion register 150; ST41 is a shift state in which the shift parallel conversion register 150 is shifted; ST42 is a work state (a reserved state for operation switchover); ST43 is a pause state; ST44 is another work state (a reserved state for operation switchover); and ST45 is an update state in which the command is output from the shift parallel conversion register 150 to the command register SDIR. The process brings the supplied command from the serial data input terminal TDI into the command:register SDIR via the shift parallel conversion register 150. Depending on the direction of state transition, some control states selected halfway through the process may be dummy states.

Operation Modes and Address Space of the Microcomputer

In FIG. 1, reference numeral 17 represents a system controller that controls operation modes and other related aspects of the microcomputer 1. In this example, an emulator mode signal ASEMDO is presented as a typical mode signal. The reset signal/RST of the microcomputer 1 is also supplied, but not limited, to the system controller 17.

As shown in FIG. 4, when ASEMDO=0, the microcomputer 1 is brought into ASE mode (evaluation mode or debug mode); when ASEMDO=1, the microcomputer 1 is placed in main unit chip mode (product mode).

The product mode is a mode in which the microcomputer 1 as an evaluation chip operates as a product chip (i.e., not in debug mode). The address space for the CPU 10 in product mode comprises a user memory area (User_MEM) 110, an external memory space (external to the microcomputer 1) and a peripheral module space, together with reserved (i.e., unusable) spaces. The peripheral module space is illustratively made up of internal register spaces for such peripheral circuits as the interrupt controller 12 and bus controller 13 incorporated in the product chip. The user memory area 110 in the product chip includes a work area, a temporary data storage area and a program area provided in an internal RAM or ROM. In product mode, the CPU 10 fetches instructions from the user memory area 110 or from the program area in the external memory space and executes the fetched instructions. The beginning of the user memory area 110 is assigned a vector table area for exception processing such as reset processing. When the CPU 10 is reset in product mode (i.e., power-on reset, hardware reset or software reset), the CPU 10 acquires the reset vector located at the beginning (H'0000000) of the vector table, first executes a reset processing program designated by the vector, and proceeds with subsequent program processing.

The evaluation mode is also called debug mode. The user mode refers specifically to an operation mode in which the CPU 10 is allowed to execute the user program in the user memory area 110 as in the case of product mode. The break mode is an operation mode that allows the CPU 10 to execute the debug program in the AMM area 111 for debug use.

Figure 7:
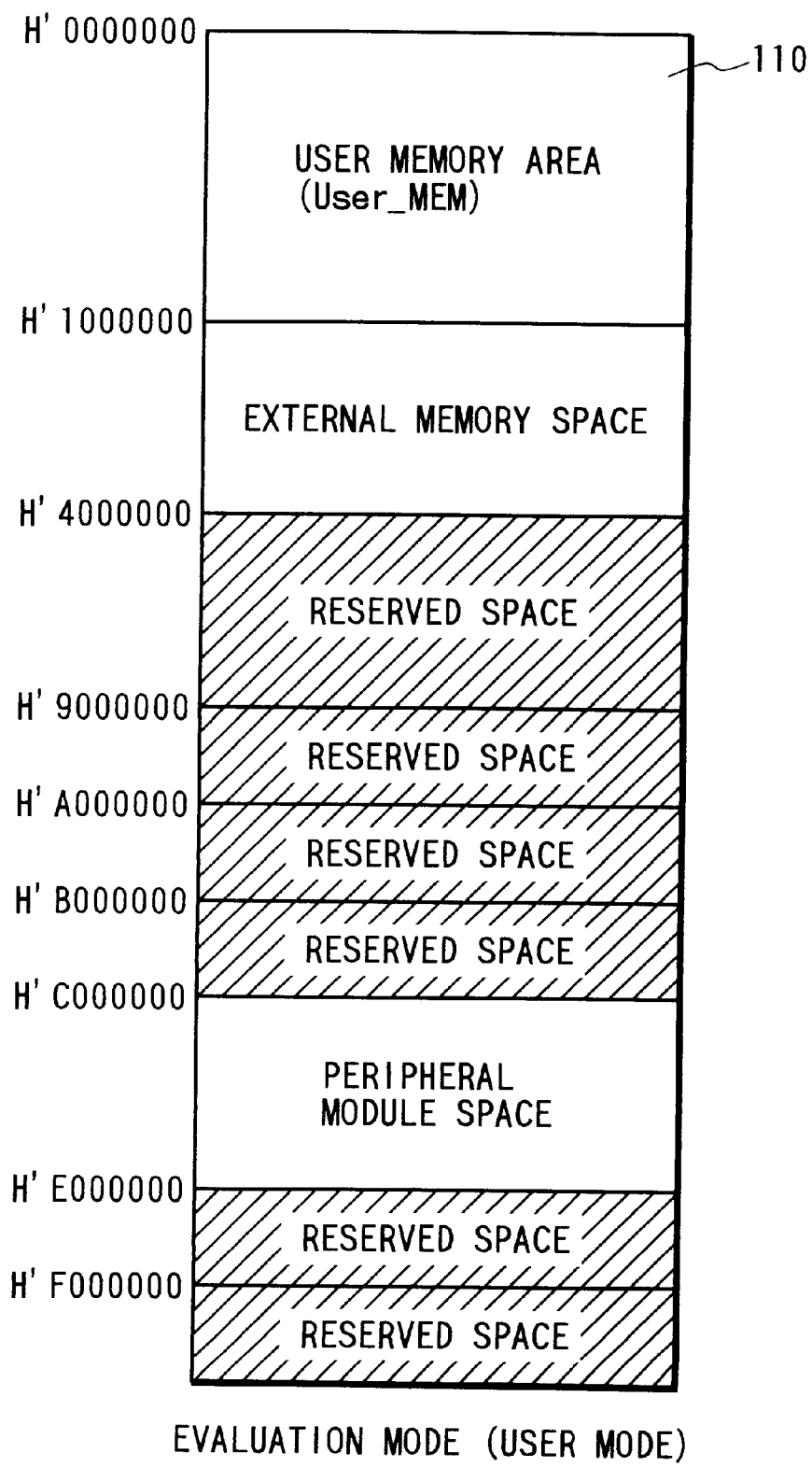
FIG. 7 is an explanatory view of an address space for the CPU in user mode.

The address space for the CPU 10 in user mode is shown in FIG. 7. This address space is the same as in the case of product mode.

Figure 6:
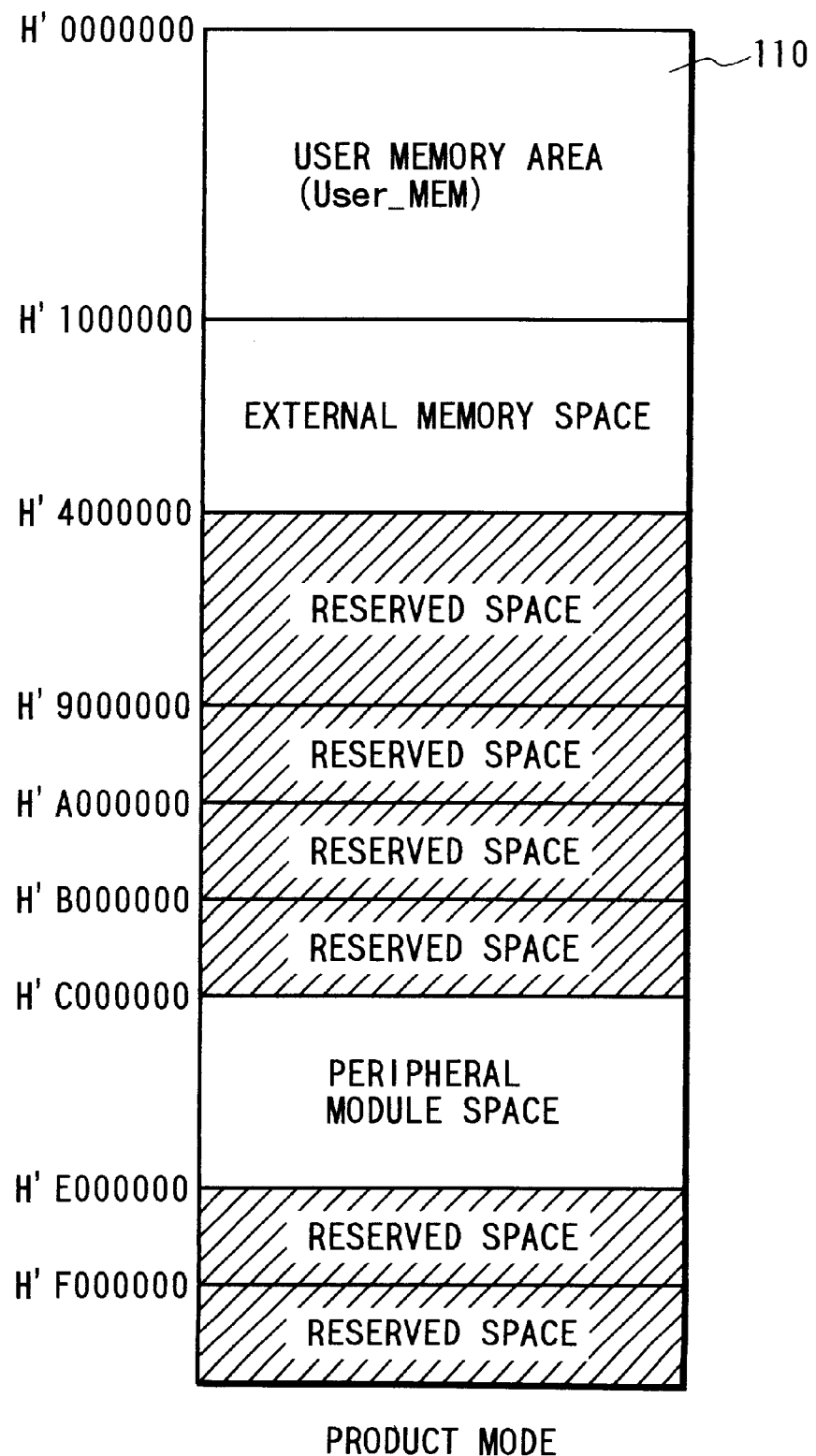
FIG. 6 is an explanatory view of an address space for the CPU in product mode.
Figure 8:
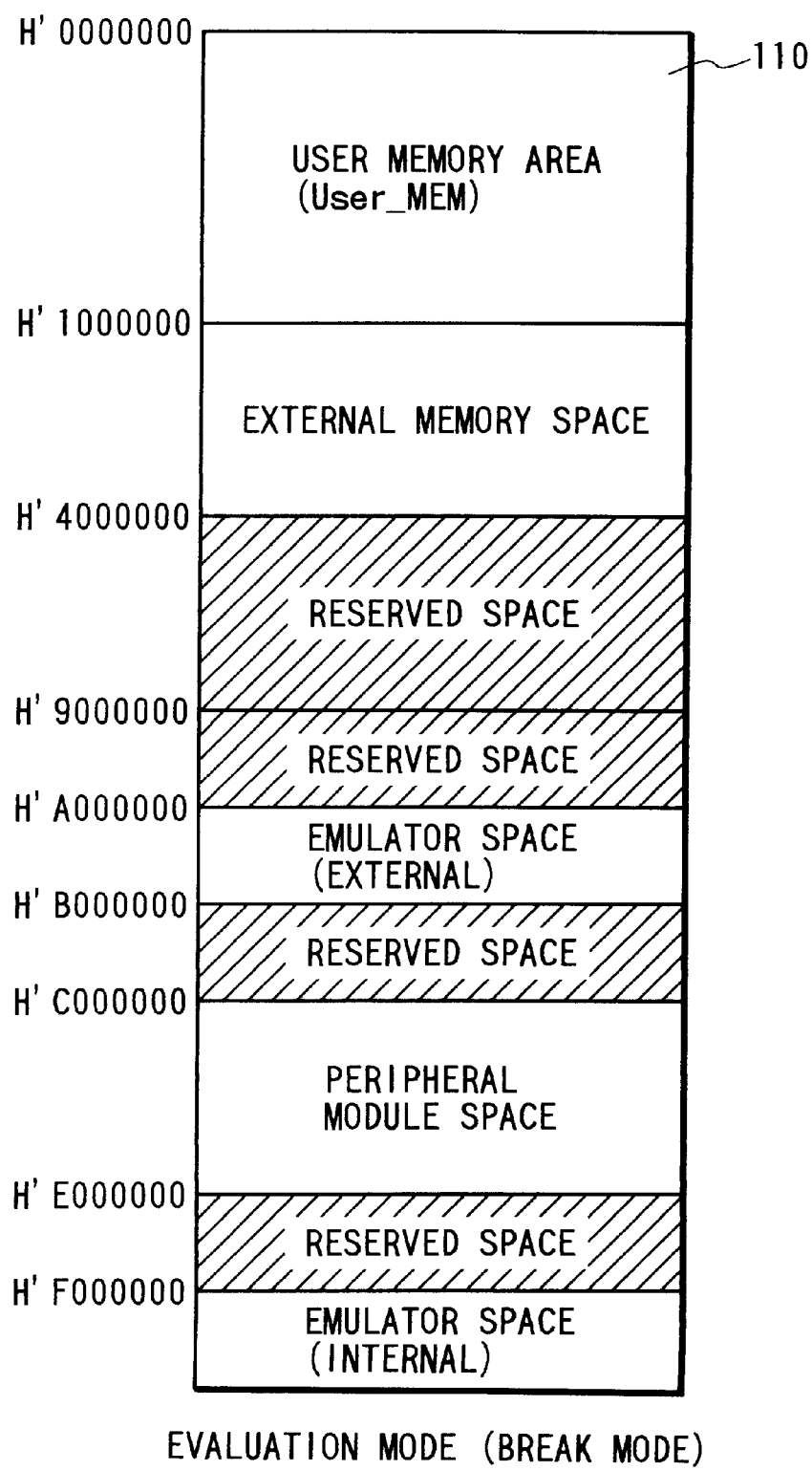
FIG. 8 is an explanatory view of an address space for the CPU in break mode.
Figure 9:
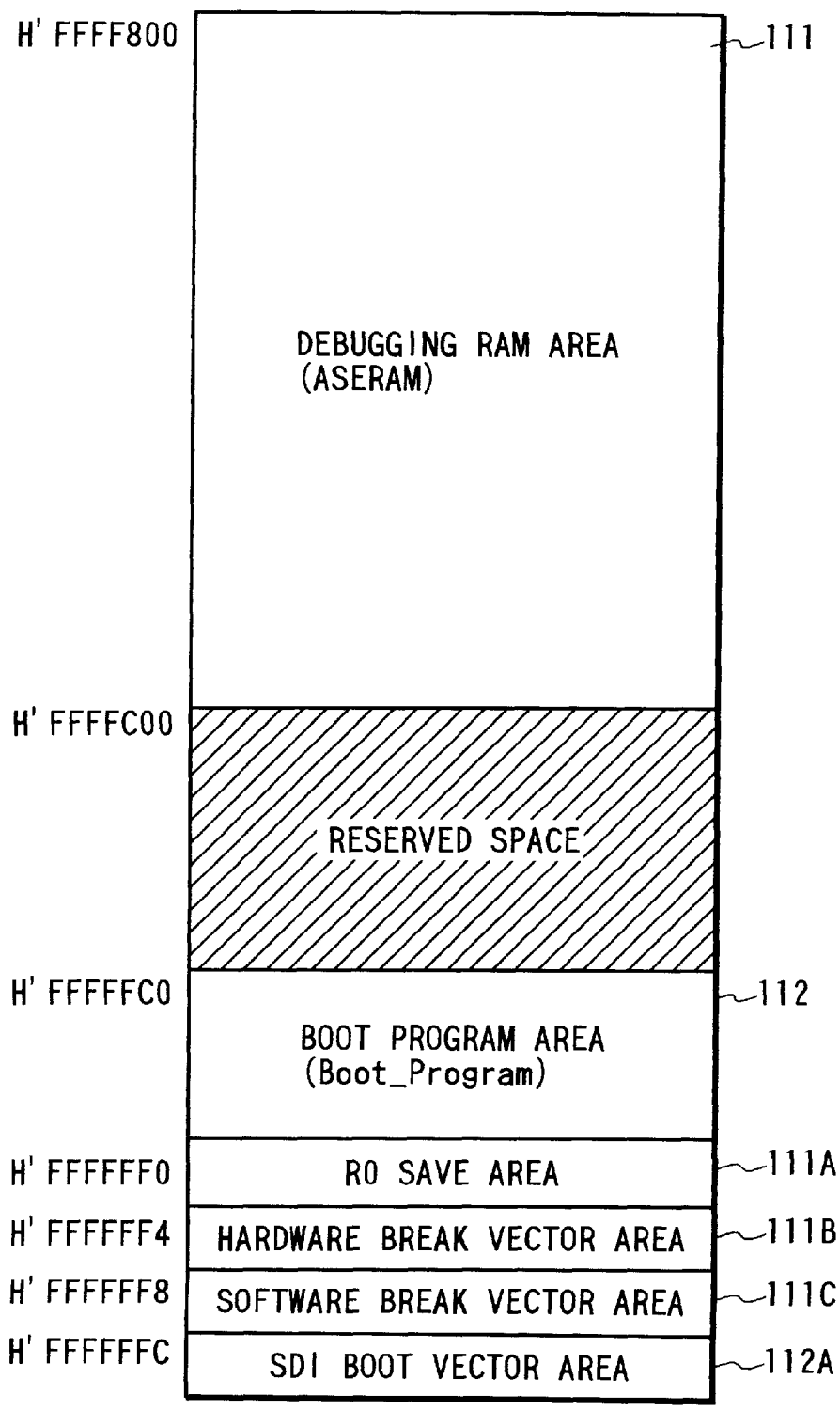
FIG. 9 is an explanatory view of a detailed internal emulator space allocated in break mode.

The address space for the CPU 10 in break mode is illustrated in FIG. 8. Compared with the address space in user mode, the address space of FIG. 8 is supplemented with emulator space segments (internal and external). If an ASE terminal (not shown) is provided, the external emulator space may be used illustratively as a trace space. The internal emulator space is illustratively partitioned as shown in FIG. 9. The internal registers SDIR, SDSR and SDDR in the serial interface circuit 15 as well as the internal register 140 in the break controller 14 are mapped to peripheral module spaces indicated in FIGS. 6, 7 and 8. In the address map of FIG. 9, an R0 save area 111A is an area that temporarily accommodates the value saved from an internal register R0 in the CPU 10 upon switchover from user mode to break mode. The saved value from user mode may later be referenced when the CPU 10 performs processing entailing an operation mode switchover using the register R0. A hardware break vector area 111B is a vector storage area used for a program space switchover by the CPU 10 when a hardware break occurs. A hardware break is generated by the interrupt request signals brks and SDI_brk., A software break vector area 111C is a vector storage area utilized for a program space switchover by the CPU 10 in case of a software break. The R0 save area 111A, hardware break vector area 111B and software break vector area 111C constitute part of the debug-use RAM area 111 and are thus furnished in RAM form. An SDI boot vector area 112A is a vector storage area referenced by the CPU 10 when the interrupt request signal SDI_boot is accepted. Illustratively, the vector stored in the area 112A is data that points to the starting address H'FFFFC0 of the boot program area 112. The SDI boot vector area 112A is part of the boot program area 112A and is furnished in ROM form.

Boot Operations to Establish Break Mode Using SDI_boot

Below is a description of how break mode is established in evaluation mode (i.e., debug mode) and how operation mode transition takes place between break mode and user mode.

Figure 10:
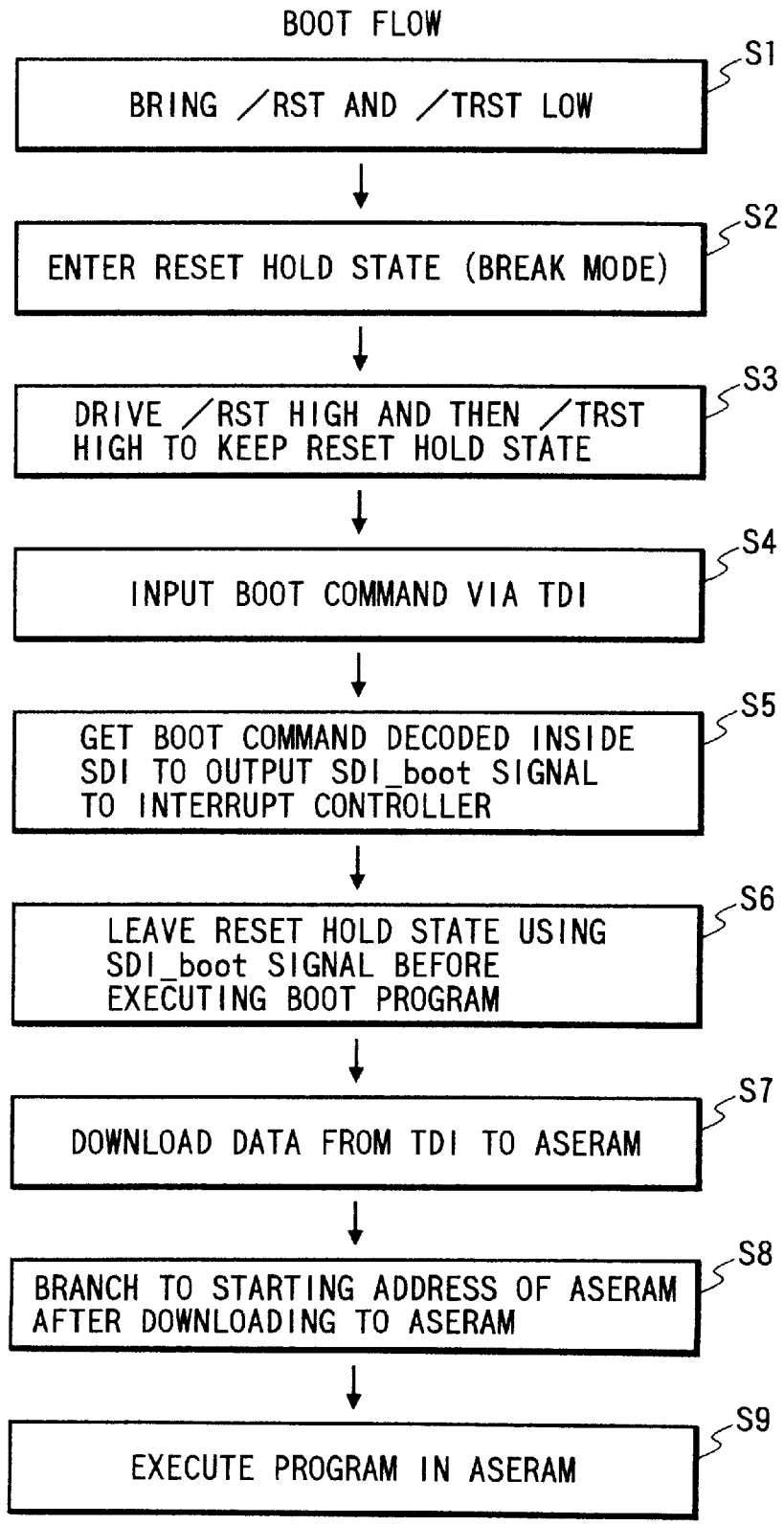
FIG. 10 is a flowchart of steps constituting a procedure for controlling boot operations to establish break mode using an interrupt request signal SDI_boot.
Figure 11:
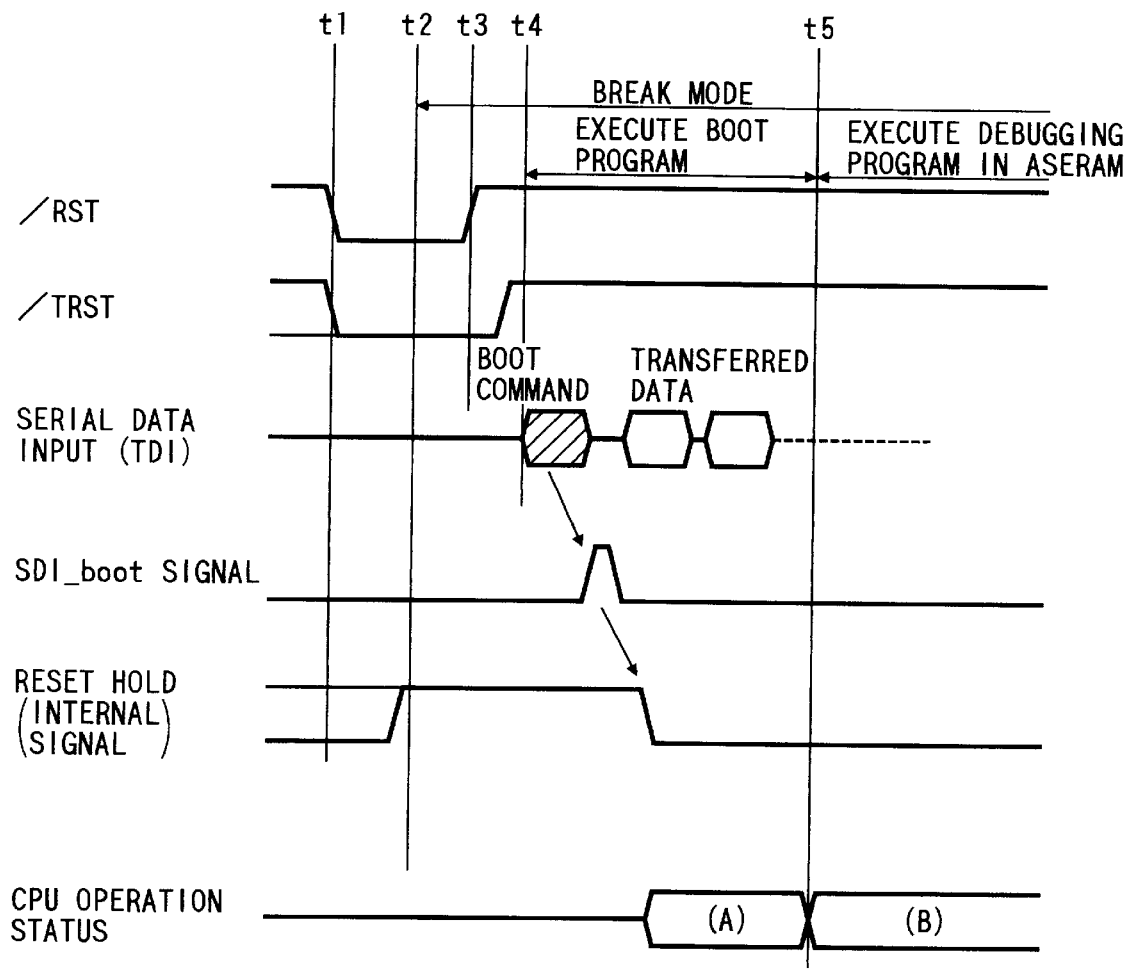
FIG. 11 is a timing chart of typical boot operations for establishing break mode by use of the interrupt request signal SDI_boot.

FIG. 10 is am flowchart of steps constituting a procedure for controlling boot operations to establish break mode. FIG. 11 is a timing chart of typical boot operations for establishing break mode.

To establish debug mode requires that the mode signal ASEMDO be brought Low and that the reset signal/RST of the microcomputer 1 as well as the reset signal ITRST of the serial interface circuit 15 be also brought Low (step 1). This initializes the serial interface circuit 15 and places the microcomputer 1 in a reset hold state (step 2). The reset hold state of the microcomputer 1 is maintained by driving the reset signals/RST and/TRST High successively in that order. This places the microcomputer 1 into debug mode. The CPU 10 resorts to the address mapping in break mode shown in FIG. 8. With the microcomputer 1 in the reset hold state, the CPU 10, interrupt controller 12 and serial interface circuit 15 remain operable.

In this state, the state control signal TMS is changed as needed in synchronism with the transfer clock signal TCK, and a boot command is input through the serial data input terminal TDI to the command register SDIR (step 4). The command decoder 154 decodes the boot command and outputs accordingly a boot interrupt request signal SDI_boot to the interrupt controller 12 (step 5).

Upon receipt of the boot interrupt request signal SDI_boot, the interrupt controller 12 supplies the CPU 10 with interrupt cause data and an interrupt signal corresponding to the interrupt in question. The interrupt signal frees the CPU 10 from its reset hold state and allows the CPU 10 to acquire in hardware terms a vector address based on the interrupt cause data. This is how the CPU 10 acquires the vector in the SDI boot vector area 112A shown in FIG. 9. In this example, the vector points to the starting address H'FFFFFFFC of the boot program area 112. With the vector thus obtained, the CPU 10 starts executing the boot program in the boot program area 112 (step 6).

The boot program is a program that controls the transfer of data supplied through the serial data input terminal TDI to the RAM area 111 for debug use. That is, executing the boot program downloads to the debug-use RAM area 111 the debug program and related data such as the vector table supplied to the serial data input terminal TDI by way of the serial interface circuit 15 (step 7).

Also in the example above, the end of the boot program comprises a branch instruction for causing instruction execution of the CPU 10 to branch to the starting address H'FFFF800 of the debug-use RAM area 111. After execution of the boot program, the processing of the CPU 10 thus branches to the debug program in the RAM area 111 for debug use (step 8). The CPU 10 is now allowed to execute the debug program (step 9). In this manner, the microcomputer 1 establishes the break mode which servers as the evaluation mode.

In FIG. 11, time t1 represents a time at which the above-described reset hold state is established. With the reset hold state in effect, break mode is entered at time t2. After the reset signal/RST is driven High at time t3, driving the reset signal/TRST High frees the serial interface circuit 15 from its reset state. The reset hold state of the CPU 10 remains unchanged. When the boot command is issued at time t4, an interrupt frees the CPU 10 from its reset hold state. The CPU 10 then executes the boot program, downloading the data input through the serial data input terminal TDI to the debug-use RAM area 111. Upon completion of boot program execution at time t5, the instruction execution of the CPU 10 branches to the debug program downloaded to the RAM area 11 for debug use, as described above.

The contents of the debug program may be determined as desired by the user in accordance with the configuration of the system to which the microcomputer 1 is applied.

In this example, the beginning of the RAM area 111 for debug use may contain a transfer control program for downloading the user program (i.e., program to be debugged) to a program memory space in the user memory area 110 by way of the serial interface circuit 15. The debug program may illustratively comprise such a transfer control program, along with a program for outputting the internal status of the microcomputer to the outside via the serial interface circuit 15, and a program for establishing break conditions in the break controller 14 by means of the serial interface circuit 15. Alternatively, there may also be provided a program for permitting selection of such programs.

If there are provided instructions for causing instruction execution of the CPU 10 to branch to the user memory area 111 or to the address of a desired program storage area in external memory, it is also possible to execute transition from break mode to user mode.

Break Operation Triggered by SDI_brk

Figure 12:
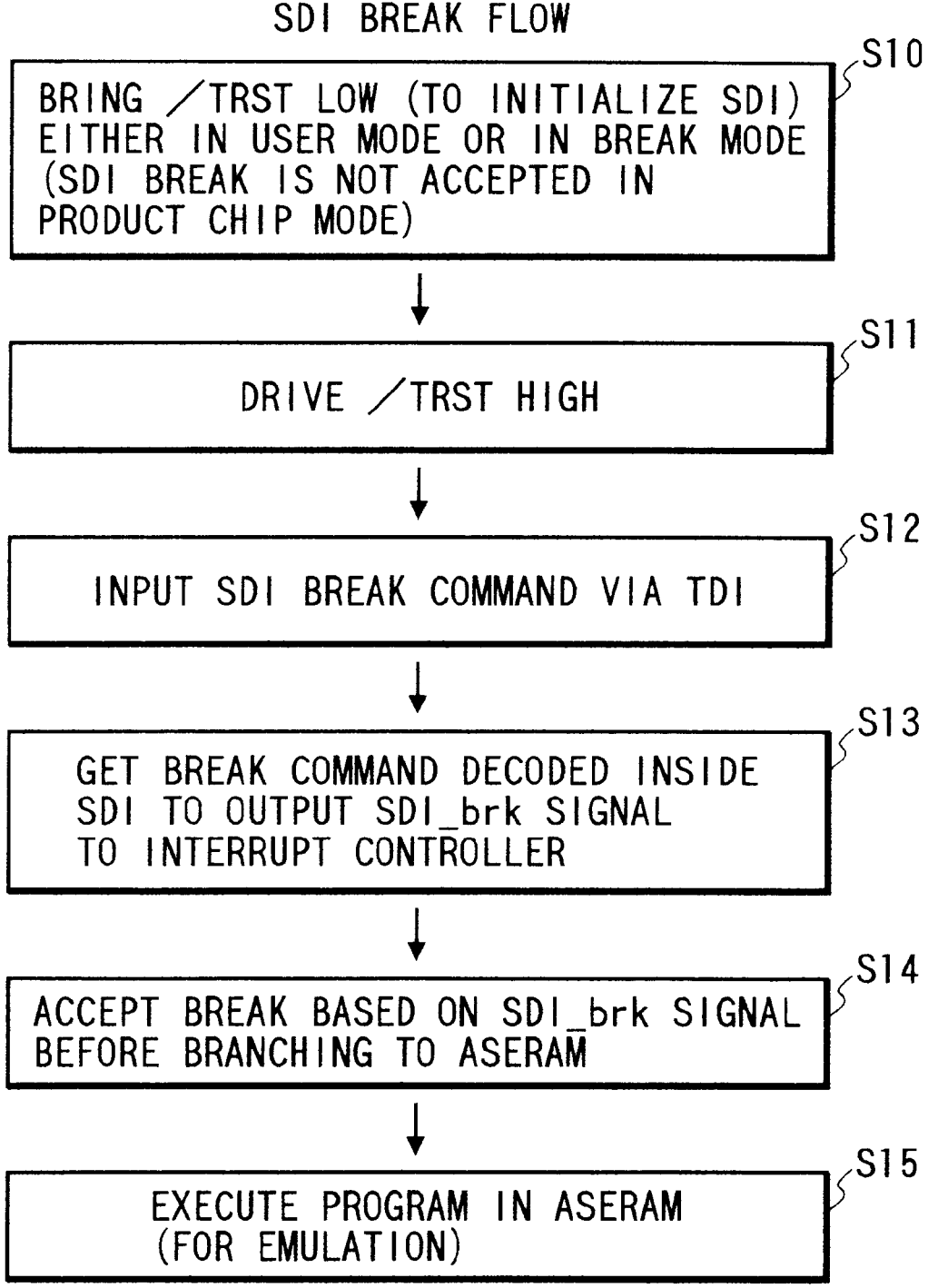
FIG. 12 is a flowchart of steps constituting a procedure for controlling transition to break mode using an interrupt request signal SDI_brk.
Figure 13:
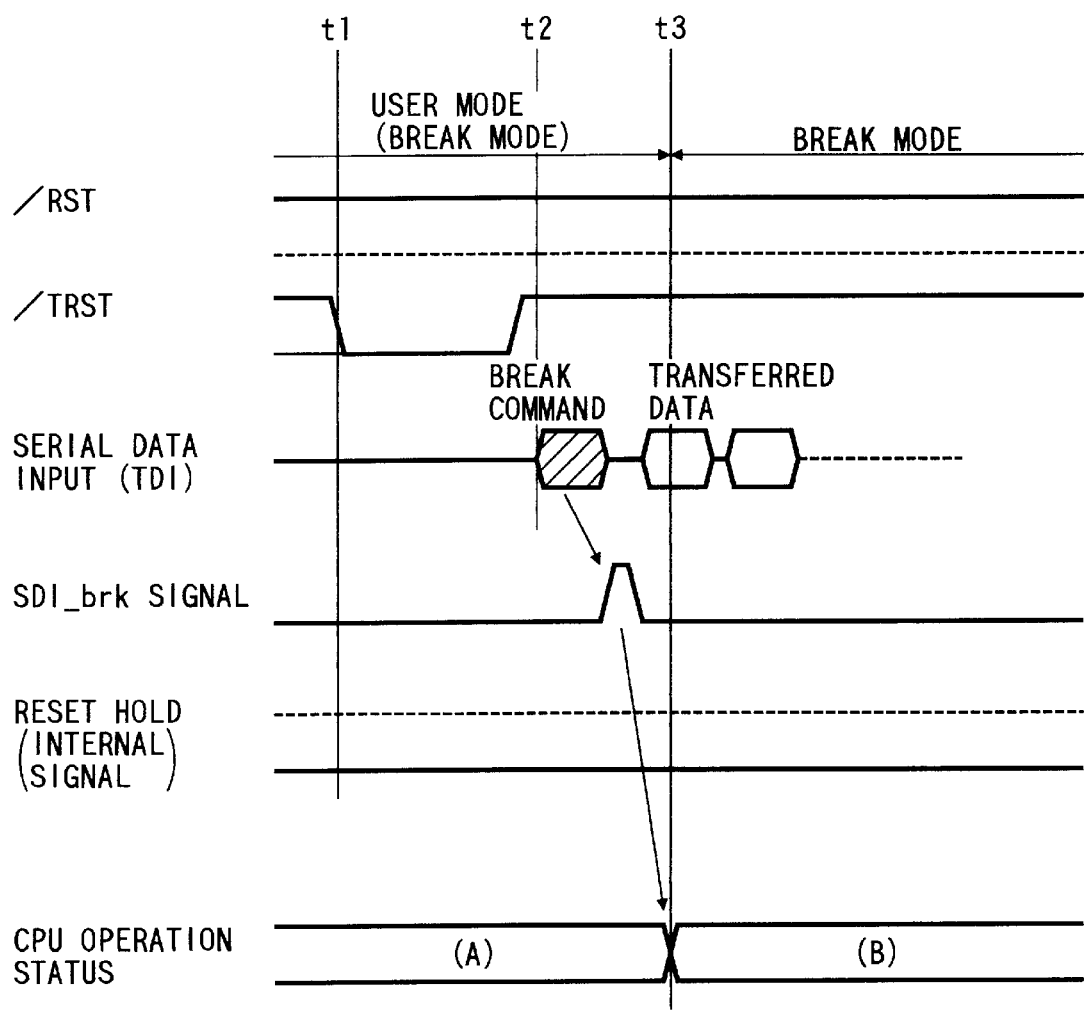
FIG. 13 is a timing chart of typical operations for transition to break mode by use of the interrupt request signal SDI_brk.

FIG. 12 is a flowchart of steps constituting a procedure for controlling transition to break mode using the interrupt request signal SDI_brk. FIG. 13 is a timing chart of typical operations for transition to break mode by use of that signal SDI_brk.

In user mode, the break controller 14 and serial interface circuit 15 cannot be accessed. If a break condition established in break mode by the break controller 14 is met in user mode, a break interrupt request signal brks places the microcomputer 1 into break mode. In user mode, a break interrupt request by the signal SDI_brk and an interrupt request by the signal SDI_int (to be described later) are acceptable. In product mode, any break interrupt request by the signal SDI_brk cannot be accepted.

To initiate a break with the SDI break interrupt request signal SDI_brk requires that the reset signal/TRST be first brought Low to initialize the serial interface circuit 15 (step 10) and that the reset signal/TRST be driven back High thereafter (step 11). When the break command is supplied through the serial data input terminal TDI (step 12), the command decoder 154 decodes the command and accordingly outputs the interrupt request signal SDI_brk to the interrupt controller 12 (step 13).

Upon accepting the break interrupt request, the interrupt controller 12 supplies the CPU 10 with interrupt cause data and an interrupt signal corresponding to the interrupt in question. The CPU 10 acquires in hardware terms a vector address based on the interrupt cause data. This is how the CPU 10 acquires the vector in the hardware break vector area 111B shown in FIG. 9. Part of the RAM area 111 for debug use is allocated as the hardware break vector area 111B. According to the vector set in the area 111B, the CPU 10 branches its processing to a predetermined process of the debug program (step 14). The CPU 10 executes the program at the destination of the branch to carry out emulation (step 15). Illustratively, a break condition is set in the break controller 14 through the serial interface circuit 15, or the value of an internal register in the CPU 10 is read out via the serial interface circuit 15.

Referring to FIG. 13, when the microcomputer 1 is in user mode (not excluding break mode), the reset signal/TRST resets the serial interface circuit 15 at time t1. The other circuits in the microcomputer 1 are not reset by the signal/TRST. After being freed from its reset state, the serial interface circuit 15 is supplied with a break command from the serial data input terminal TDI at time t2. This causes the break interrupt request signal SDI_brk to place the microcomputer 1 into break mode as described earlier. The CPU 10 branches its processing to a predetermined process of the debug program in the RAM area 111 for debug use. Illustratively, the CPU 10 receives via the serial interface circuit 15 necessary data for establishing a new break condition.

Interruption Triggered by SDI_int

Figure 14:
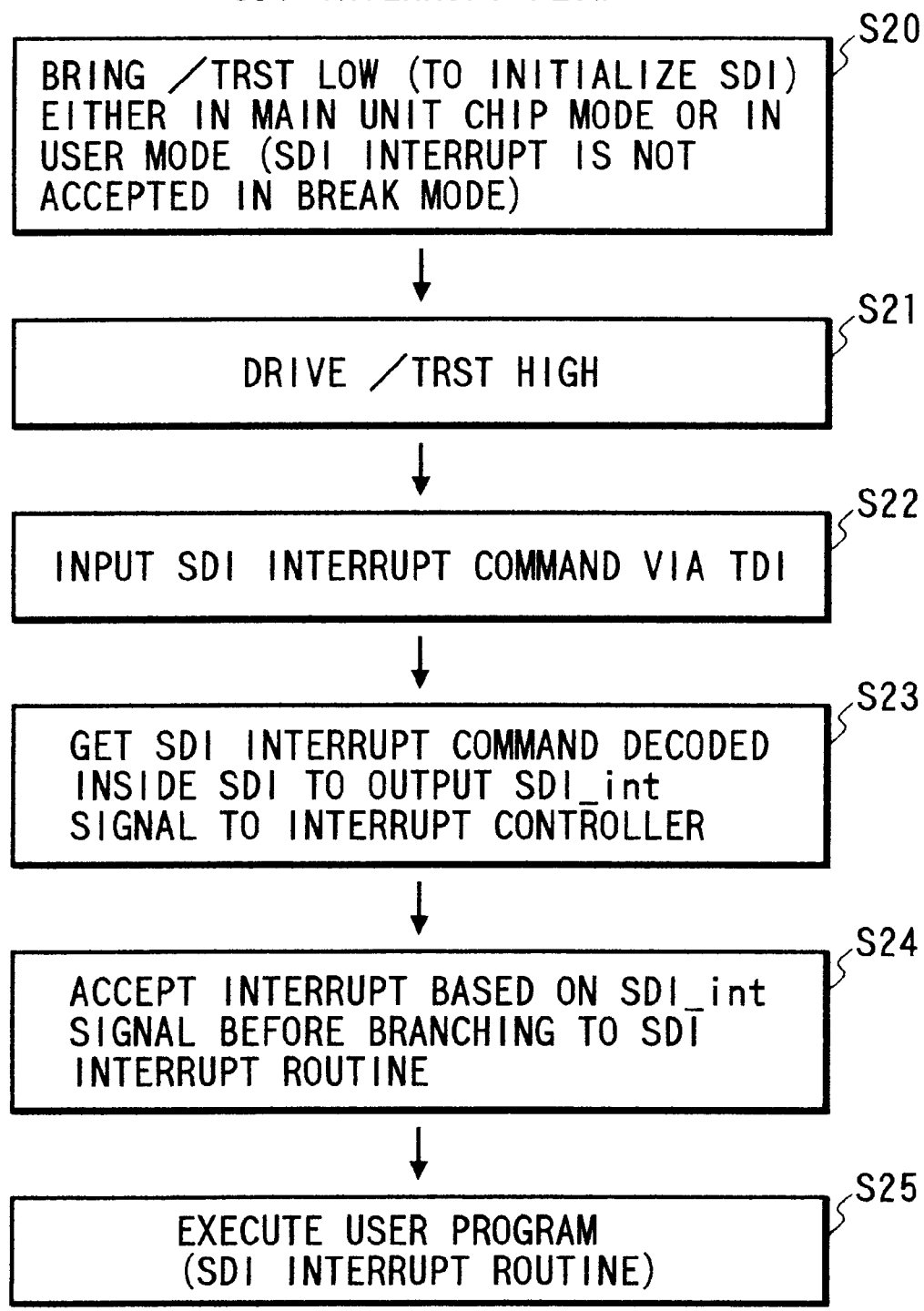
FIG. 14 is a flowchart of steps constituting a procedure for controlling interrupts using an interrupt request signal SDI_int.
Figure 15:
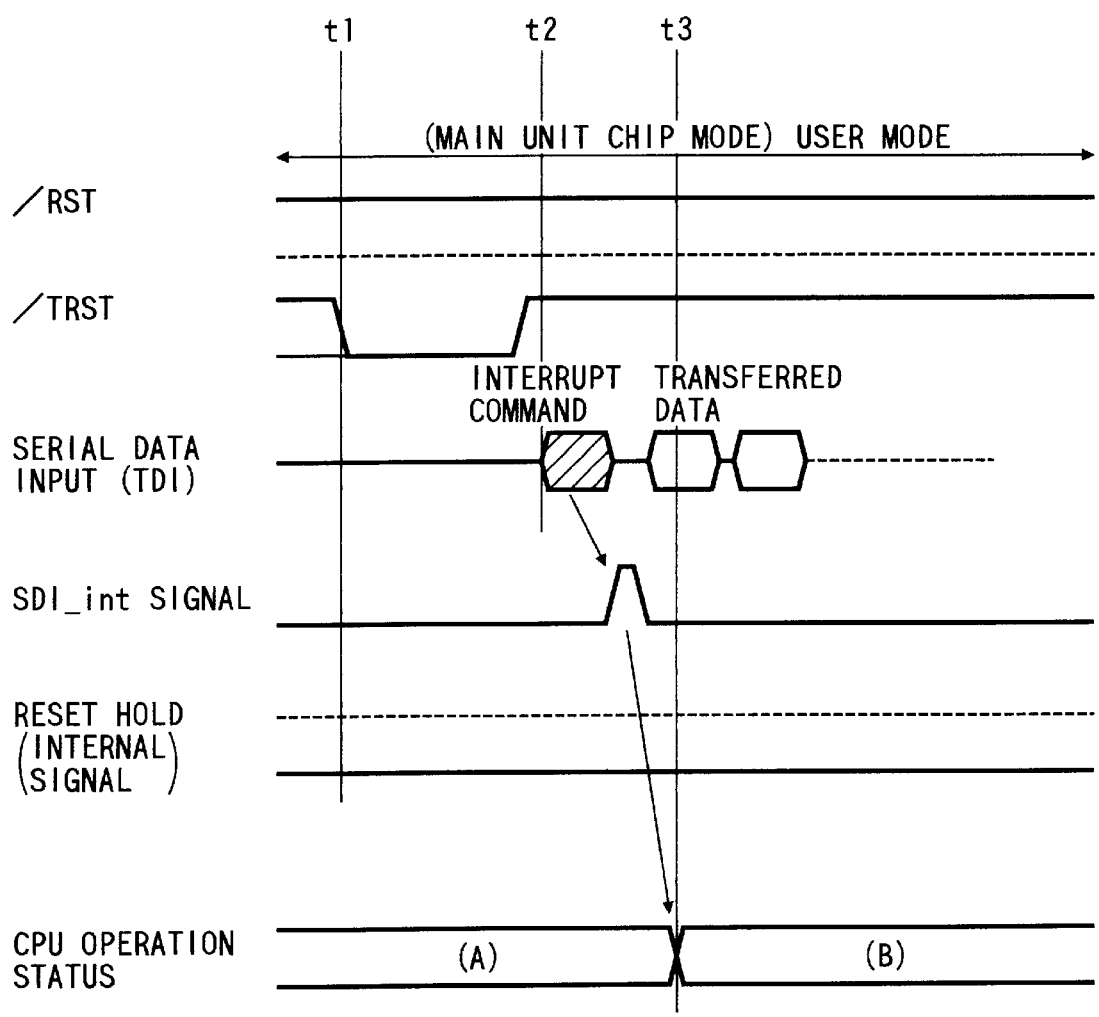
FIG. 15 is a timing chart of typical operations for controlling interrupts by use of the interrupt request signal SDI_int.

FIG. 14 is a flowchart of steps constituting a procedure for controlling interrupts using the interrupt request signal SDI_int. FIG. 15 is a timing chart of typical operations for controlling interrupts by use of that signal SDI_int.

Interrupts by the interrupt request signal SDI_brk may be accepted either in product mode or in user mode (not in break mode). This is because a vector table to be referenced for such interrupts must be created in the user memory area 110.

To initiate an interrupt with an SDI interrupt request signal SDI_int requires that the reset signal/TRST be first brought Low to initialize the serial interface circuit 15 (step 20) and that the reset signal/TRST be later brought back High (step 21). When an interrupt command is fed through the serial data input terminal TDI (step 22), the command decoder 154 decodes the command and accordingly outputs the interrupt request signal SDI_int to the interrupt controller 12 (step 23).

Upon accepting the interrupt request, the interrupt controller 12 supplies the CPU 10 with interrupt cause data and an interrupt signal corresponding to the interrupt in question. The CPU 10 acquires a vector address based on the interrupt cause data. Using the vector address, the CPU 10 obtains the corresponding vector from the user memory area 110. The vector, suitably determined beforehand by the user program, causes the CPU 10 to branch its processing to a predetermined process of the user program (step 24). The CPU 10 executes the user program starting from the branch destination (step 25).

Referring to FIG. 15, when the microcomputer 1 is in user mode (not excluding main unit chip mode), the reset signal/TRST resets the serial interface circuit 15 at time t1. The other circuits in the microcomputer 1 are not reset by the signal/TRST. After being freed from its reset state, the serial interface circuit 15 is supplied with an interrupt command through the serial data input terminal TDI at time t2. This causes the interrupt request signal SDI_int to branch the processing of the CPU 10 to the process which has been requested by the interrupt in the manner described above.

Figure 16:
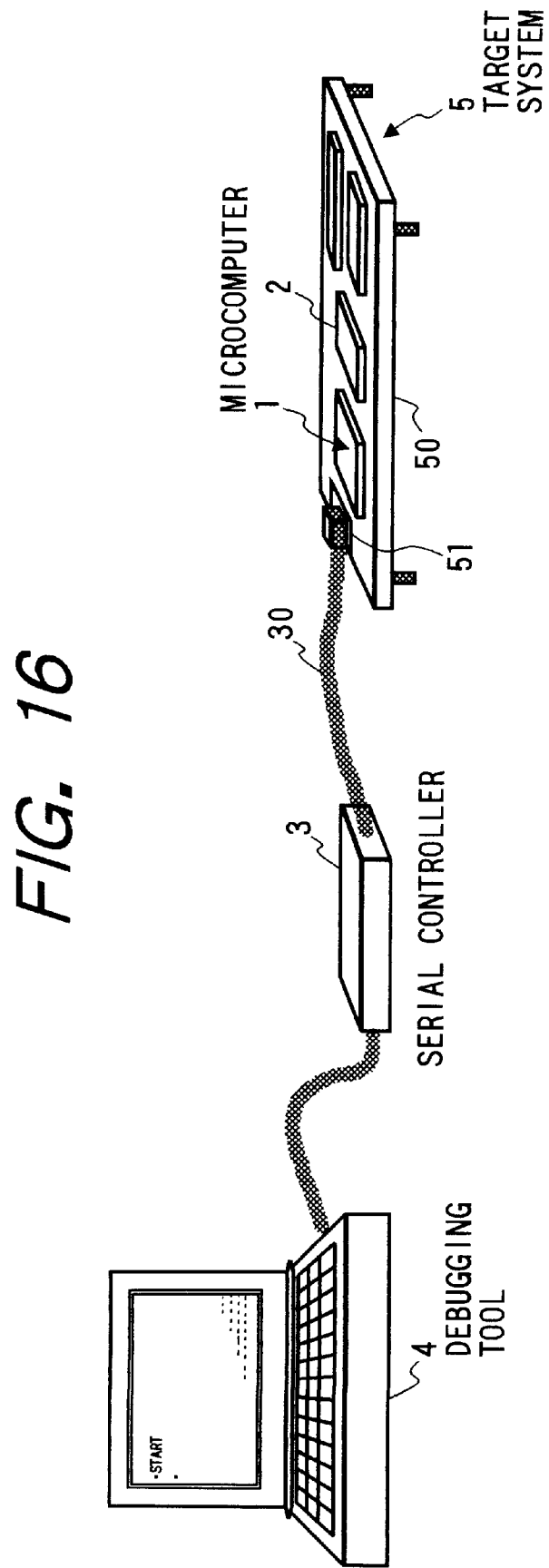
FIG. 16 is a perspective view of a typical setup in which a target system incorporating the microcomputer of FIG. 1 is interfaced with a debugging tool.

FIG. 16 is a perspective view of a typical setup in which a target system incorporating the microcomputer of FIG. 1 is to be debugged. The configuration in FIG. 16 corresponds to that in FIG. 2. The target system 5 is interfaced with the debugging tool 4 by means of the serial controller 3 and serial interface circuit 15. A typical debugging tool 4 may be a portable personal computer that can execute an emulation program. The serial controller 3 controls the signals/TRST, TCK and TMS according to data transfer instructions from the debugging tool 4. At the same time, the serial controller 3 supplies data serially to the serial data input terminal TDI and receives serial data from the serial data output terminal TDO. In the above example, the protocol for serial data transfers is based on, but not limited to, criteria of the JTAG (Joint Test Action Group) used for the testing of numerous semiconductor integrated circuits mounted on circuit boards.

In FIG. 16, a circuit board 50 of the target system 5 has an external connection connector 51 for connecting the serial controller 3 with the serial interface circuit 15 of the microcomputer 1. The connector 51 need only address five signals (/TRST, TCK, TMS, TDI and TDO) and thus occupies only a limited area on the circuit board. The reduced scale of the connector is suitable for a small-size target system such as a portable communication terminal or like equipment to be carried around. The external connection connector 51 is coupled to the serial controller 3 via an interface cable 30.

If the target system 5 is illustratively a portable communication terminal such as a portable telephone set, it may be desired to perform system or software debugging of the system outdoors, i.e., in a setup closely approximating the real-use environment. In such a case, because the number of signal lines necessary for interfacing the target system 5 to the debugging tool is minimized, it is quite easy to implement the necessary debug operations in the field with no elaborate preparations.

As described, when the target system 5 is subjected to software or system debugging, the user program to be debugged is executed by the microcomputer 1. The data acquired from the debugging process is referenced externally when the user program is traced for debugging through its execution. In some cases, the break controller 14 may contain trace data for tracing the execution of the user program. To reference externally the data coming out of user program execution or to set operating conditions of the user program requires that a debug program different from the user program be executed by the microcomputer 1. The boot program described above serves as an operation program of the CPU for downloading the debug program to the debug-use RAM area 111 which is separated from the user program storage area 110. A necessary debug program dependent on the configuration of the target system 5 is prepared in advance, and the SDI boot command is issued by the debugging tool 4 to the serial interface circuit 15. This causes the microcomputer 1 to initiate the boot program and to download to the debug-use RAM area 111 the debug program that is fed to the serial interface circuit 15. Thus when data stemming from user program execution is to be referenced externally or when operating conditions of the user program are to be established upon debugging, the operations involved are carried out as specified by the contents of the downloaded debug program. Any debug operations may be carried out in accordance with the contents of the program created by the debugging tool 4, whereby the variability of debug operations is guaranteed. The debug operation of the microcomputer 1 is in no way limited by the type of the commands that may be accepted by the serial interface circuit 15.

The target system is interfaced with the debugging tool 4 through the use of the serial interface circuit 15. This arrangement minimizes the number of interface terminals for debug use. Under such constraints, both the variability of debug operations and the ease of use are still ensured by the invention.

Where the target system 5 is illustratively a portable communication terminal or like portable equipment, it may be desired to perform system or software debugging of the system in an outdoor setup closely approximating the real-use environment. In such a case, because the number of interfacing connector terminals necessary for debug use is minimal, the debug operations involved are readily implemented in the field with no elaborate preparations.

The boot program may at its end include an instruction for causing the CPU 10 to branch its instruction execution to a predetermined address (e.g., H'FFFF800) of the debug program transferred to the RAM area 111 for debug use. This makes it possible automatically to initiate the downloaded debug program, whereby initial control operations are quickly started.

Suppose that one such initial operation is the downloading of the user program to be debugged. In that case, a transfer control program that may be included in the debug program transfers the user program to the rewritable user memory area 110 furnished in the internal memory 11.

Since the user program can be placed in the user memory area 110 inside the microcomputer 1 upon debugging, it is possible to run the user program at the actual operating speed for debugging purposes.

Given the externally supplied SDI break command, the serial interface circuit 15 outputs the SDI interrupt request signal (SDI_brk) to the interrupt controller 12. In response to the interrupt request signal, the interrupt controller 12 supplies the CPU 10 with interrupt control data for executing a predetermined instruction in the debug program. In this manner, halfway through user program execution, the operation program for the CPU 10 is switched to the debug program (the action is called a break operation) as desired by the host system 4 through the serial interface circuit 15.

In that case, the debug-use RAM area 111 is assigned the hardware break vector area 111B which is used by the CPU 10, having received interrupt control data based on the SDI break command, to acquire a predetermined instruction address of the debug program. Because the hardware break vector area 111B is an area rewritable by the CPU 10 according to the debug program, it is possible to determine as needed the type of debug processing to be executed by issuing such a break command.

In accordance with the externally supplied SDI interrupt command, the serial interface circuit 15 outputs the SDI interrupt request signal SDI_int to the interrupt controller 12. In response to the interrupt request signal, the interrupt controller 12 supplies the CPU 10 with interrupt control data for executing an appropriate program in the user memory area 110 or in any other user memory space. In this manner, halfway through user program execution, the host system 4 may interrupt CPU execution as desired by use of the serial interface circuit 15.

When data is input and output between the microcomputer 1 and its outside serially and asynchronously through the serial interface circuit 15, access to the data register SDDR by the CPU 10 is permitted depending on the state of the flag FLG. This scheme prevents inadvertent overwrite operations on the data register SDDR that is accessed asynchronously both by the CPU 10 and by an external entity, whereby asynchronous and serial data exchanges with the outside are readily implemented.

The state controller 153 detects the state in which the flag FLG being set to the logical 1 is output to the outside of the microcomputer 1. At that point, the state controller 153 allows the data register SDDR to be accessed from outside the microcomputer 1. After completion of externally initiated access to the data register SDDR, the state controller 153 enables the flag FLG to be changed to the logical 0. This arrangement eliminates the need for dedicated signal lines to output the flag (FLG) data out of the microcomputer 1. The signal lines for serial data input and output may be utilized instead.

While the preferred embodiment of the invention has been described, it is to be understood that modifications will be apparent to these skilled in the art without departing from the spirit of the invention.

For example, the data processor is not limited to the microcomputer; it may be any one of logic LSI's including digital signal processors specialized in digital signal processing, microprocessors, and microcontrollers dedicated to equipment control. The circuit modules included in such data processors are not restricted by the examples given above.

Major benefits of the invention disclosed in this specification are summarized as follows:

Any debug operations may be performed in accordance with the contents of the debug control program downloaded by the boot program. This guarantees the variability of debug operations. The debug operation of the data processor is not limited by the type of the commands that may be accepted by the serial interface means.

The serial interface means used for interfacing with the host system reduces the number of interfacing connector terminals necessary for debug use. Under such constraints, both the variability of debug operations and the ease of use are still ensured by the invention.

Where the target system is illustratively a portable communication terminal or like portable equipment, it is easy to perform system or software debugging of the system in an outdoor setup closely approximating the real-use environment. Because the number of interfacing connector terminals necessary for debug use is minimal, the debug operations involved are readily implemented in the field with no elaborate preparations.

The boot program may at its end include an instruction for causing the CPU to branch its instruction execution to a predetermined address of the debug control program. This makes it possible automatically to start the downloaded debug control program, whereby initial control operations are quickly started.

When the user program is placed in a memory area inside the data processor upon debugging, it is possible to run the user program at the actual operating speed for debugging purposes.

Given an externally supplied second command (SDI break command), the serial interface means issues the corresponding interrupt request causing the CPU 10 to execute a predetermined instruction in the debug control program. In this manner, halfway through user program execution, the operation program for the CPU is switched to the debug control program (i.e., break operation) as desired by the host system through the serial interface means.

In accordance with an externally supplied third command (SDI interrupt command), the serial interface means issues the corresponding interrupt request causing the CPU 10 to execute a predetermined program in the user memory space. In this manner, halfway through user program execution, the host system may interrupt CPU execution as desired through the serial interface means.

When data is input and output between the data processor and its outside serially and asynchronously through the serial interface means, access to the data register by the CPU is permitted depending on the state of the flag FLG. This scheme prevents inadvertent overwrite operations on the data register that is accessed asynchronously both by the CPU and by an external entity, whereby asynchronous and serial data exchanges with the outside are readily implemented.

What is claimed is:

1. In a data processor formed on a semiconductor chip, said data processor comprising: an internal bus, a central processing unit coupled to said internal bus, a storage unit coupled to said internal bus and accessible by said central processing unit, an interrupt controller coupled to said internal bus and for controlling interrupts to said central processing unit, and a serial interface unit coupled to said internal bus and for outputting and inputting data serially to and from the outside of said data processor;

wherein said storage unit includes a rewritable first storage area; and wherein said central processing unit transfers a debug control program from said serial interface unit to said first storage area responding with said serial interface unit receiving and decoding a first command, and executes a predetermined instruction of said debug control program in said first storage area responding with said serial interface unit receiving and decoding a second command.

2. A data processor according to claim 1, wherein said second storage area includes a first vector used by said central processing unit to acquire a starting instruction address of said boot program upon receipt of said first interrupt control data.

3. A data processor according to claim 2, wherein said boot program includes, at the end thereof, an instruction for causing instruction execution of said central processing unit to branch to a predetermined address of said debug control program transferred to said first storage area.

4. A data processor according to claim 3, wherein said storage units has a rewritable third storage area, and wherein said debug control program includes a transfer control program for transferring data from said serial interface unit to said third storage area.

5. A data processor according to claim 4, wherein said first storage area includes a second vector used by said central processing unit to acquire a predetermined instruction address of said debug control program upon receipt of said second interrupt control data.

6. A data processor according to claim 5, wherein said serial interface unit outputs a third interrupt request signal to said interrupt controller in accordance with a third command supplied externally; and wherein, in response to said third interrupt request signal, said interrupt controller supplies said central processing unit with third interrupt control data for causing said central processing unit to execute a predetermined program in either said third storage area or a user memory space.

7. A data processing system comprising a data processor according to claim 6, and a circuit board incorporating circuits, access to said circuits being controlled by said data processor, wherein said circuit board has an external connection connector attached to said serial interface unit included in said data processor.

8. A data processing system comprising a data processor according to claim 5, and a circuit board incorporating circuits, access to said circuits being controlled by said data processor, wherein said circuit board has an external connection connector attached to said serial interface unit included in said data processor.

9. A data processing system comprising a data processor according to claim 4, and a circuit board incorporating circuits, access to said circuits being controlled by said data processor, wherein said circuit board has an external connection connector attached to said serial interface unit included in said data processor.

10. A data processing system comprising a data processor according to claim 4, and a circuit board incorporating circuits, access to said circuits being controlled by said data processor, wherein said circuit board has an external connection connector attached to said serial interface unit included in said data processor.

11. A data processing system comprising a data processor according to claim 3, and a circuit board incorporating circuits, access to said circuits being controlled by said data processor, wherein said circuit board has an external connection connector attached to said serial interface unit included in said data processor.

12. A data processing system comprising a data processor according to claim 2, and a circuit board incorporating circuits, access to said circuits being controlled by said data processor, wherein said circuit board has an external connection connector attached to said serial interface unit included in said data processor.

13. A data processing system comprising a data processor according to claim 2, and a circuit board incorporating circuits, access to said circuits being controlled by said data processor, wherein said circuit board has an external connection connector attached to said serial interface unit included in said data processor.

14. A data processing system comprising a data processor according to claim 1 and a circuit board incorporating circuits, access to said circuits being controlled by said data processor, wherein said circuit board has an external connection connector attached to said serial interface means included in said data processor.

15. A data processor according to claim 1, said serial interface unit outputs a first interrupt request signal to said interrupt controller in accordance with the decoded first command, and outputs a second interrupt request signal to said interrupt controller in accordance with the decoded second command;

wherein said interrupt controller recepts said first interrupt request signal and outputs a first interrupt control data to said central processing unit, and recepts said second interrupt request signal and outputs a second interrupt control data to said central processing unit.

16. A data processor according to claim 15, wherein said storage units includes a second storage area holding a boot program for causing said central processing unit to transfer said debug control program, and said central processing unit executes said boot program in response to said first interrupt control data.

17. In a data processor formed on a semiconductor chip, said data processor comprising: a central processing unit, a storage unit accessible by said central processing unit, an interrupt controller for controlling interrupts to said central processing unit, and a serial interface unit;

wherein said serial interface unit includes a flag operable both externally and by said central processing unit, a data register accessible both externally and by said central processing unit, and a command decoder for receiving and decoding an externally supplied command, said serial interface unit further permitting asynchronous serial data input and output between said data processor and the outside thereof;

wherein said storage unit includes a rewritable first storage area for transferring a debug control program from said serial interface unit by said central processing unit; and wherein, in response to a first command included in said externally supplied command said central processing unit gains access to said data register if said flag is in a first state, said central processing unit further changing said flag to a second state when access to said data register is completed.

18. A data processor according to claim 17, further comprising a state controller for making said data register accessible from outside said data processor upon detection of said flag in said second state being output to the outside of said data processor, said state controller further allowing said flag to be changed to said first state upon completion of access to said data register by said data processor.

19. A data processing system comprising a data processor according to claim 18, and a circuit board incorporating circuits, access to said circuits being controlled by said data processor, wherein said circuit board has an external connection connector attached to said serial interface unit included in said data processor.

20. A data processing system comprising a data processor according to claim 17, and a circuit board incorporating circuits, access to said circuits being controlled by said data processor, wherein said circuit board has an external connection connector attached to said serial interface unit included in said data processor.

21. A data processor according to claim 17, wherein said serial interface unit supplies said interrupt controller with an interrupt request signal reflecting the decoded result of said command; wherein said interrupt controller recepts a first interrupt request signal included in said interrupt request from said serial interface unit, and outputs a first interrupt control data to said central processing unit.

* * * * *